(12) United States Patent
Atkinson

(10) Patent No.: US 6,887,938 B2
(45) Date of Patent: May 3, 2005

(54) COMPOSITIONS CONTAINING POLYPHENYLENE ETHER AND/OR POLYSTYRENE HAVING IMPROVED TRIBOLOGICAL PROPERTIES AND METHODS FOR IMPROVING TRIBOLOGICAL PROPERTIES OF POLYPHENYLENE ETHER AND/OR POLYSTYRENE COMPOSITIONS

(75) Inventor: Paul Michael Atkinson, Exton, PA (US)

(73) Assignee: General Electric Company, Pittsfield, MA (US)

( * ) Notice: Subject to any disclaimer, the term of this patent is extended or adjusted under 35 U.S.C. 154(b) by 13 days.

(21) Appl. No.: 10/358,062

(22) Filed: Feb. 4, 2003

(65) Prior Publication Data

US 2004/0152820 A1 Aug. 5, 2004

(51) Int. Cl.$^7$ .......................... C08L 23/06; C08L 53/02; C08L 71/12
(52) U.S. Cl. .......................... 525/132; 525/90; 525/240; 525/241
(58) Field of Search .......................... 525/133, 90, 240, 525/241, 68, 132

(56) References Cited

U.S. PATENT DOCUMENTS

| | | | |
|---|---|---|---|
| 3,312,516 A | 4/1967 | Krahn | |
| 3,774,983 A | 11/1973 | Lagally | |
| 4,166,055 A | * 8/1979 | Lee, Jr. | ...................... 524/141 |
| 4,174,358 A | 11/1979 | Epstein | |
| 4,371,445 A | 2/1983 | Faigle | |
| 4,390,657 A | 6/1983 | Liu | |
| 4,391,951 A | 7/1983 | Scheetz | |
| 4,397,982 A | 8/1983 | Boutni et al. | |
| 4,501,676 A | 2/1985 | Moorhouse | |
| 4,520,164 A | 5/1985 | Liu | |
| 4,832,422 A | 5/1989 | Fortmann | |
| 4,892,904 A | * 1/1990 | Ting | ........................... 524/494 |
| 4,945,126 A | 7/1990 | Crosby et al. | |
| 4,987,170 A | 1/1991 | Ishida et al. | |
| 5,006,601 A | 4/1991 | Lutz et al. | |
| 5,021,504 A | 6/1991 | Fujita et al. | |
| 5,039,714 A | 8/1991 | Kasahara et al. | |
| 5,147,931 A | 9/1992 | Sakuma et al. | |
| 5,166,264 A | 11/1992 | Lee, Jr. et al. | |
| 5,194,495 A | 3/1993 | Lundy et al. | |
| 5,262,477 A | 11/1993 | Kasai et al. | |
| 5,369,173 A | 11/1994 | Furuta | |
| 5,397,822 A | 3/1995 | Lee, Jr. | |
| 5,418,287 A | 5/1995 | Tanaka et al. | |
| 5,418,291 A | 5/1995 | Uno et al. | |
| 5,475,054 A | 12/1995 | Abe et al. | |
| 5,486,562 A | 1/1996 | Borman et al. | |
| 5,504,139 A | 4/1996 | Davies et al. | |
| 5,683,818 A | 11/1997 | Bolvari | |
| 5,750,620 A | 5/1998 | Davies et al. | |
| 5,902,850 A | 5/1999 | Akihiko et al. | |
| 6,031,049 A | 2/2000 | Akihiko et al. | |
| 6,045,883 A | 4/2000 | Akiyama et al. | |
| 6,096,829 A | 8/2000 | Akihiko et al. | |
| 6,469,081 B1 | 10/2002 | Akihiko et al. | |
| 6,495,630 B2 | 12/2002 | Adedeji et al. | |
| 2003/0049402 A1 | * 3/2003 | Sato et al. | ............... 428/36.91 |

FOREIGN PATENT DOCUMENTS

| | | |
|---|---|---|
| DE | 3804161 A1 | 8/1989 |
| EP | 0 119 531 A2 | 9/1984 |
| EP | 0 181 094 A1 | 5/1986 |
| JP | 51-047043 | 4/1976 |
| JP | 57-108152 | 7/1982 |
| JP | 59-149940 A2 | 8/1984 |
| JP | 59-226054 A2 | 12/1984 |
| JP | 62-158739 | 7/1987 |
| JP | 62-177065 A2 | 8/1987 |
| JP | 63-215750 A | 9/1988 |
| JP | 63-215752 A | 9/1988 |
| JP | 64-075543 A | 3/1989 |
| JP | 03-039344 A | 2/1991 |
| WO | WO 88/06174 | 8/1988 |

OTHER PUBLICATIONS

R.J.M. Borggreve, et al., "Impact Behaviour of Nylon–Rubber Blends: 4. Effect of the Coupling Agent, Maleic Anhydride", *Polymer*, vol. 30, pp. 63–70 (1989).

W. Christopher, et al., "Polycarbonates", pp. 78–81, 144–147, Reinhold Pub. Corp., New York, (Jun. 1962).

D.F. Danneels, "Low Molecular Weight Ionomers as Processing Aids and Additives", presented at the High Performance Additives Conference, England (May 10, 1988) (13 pages).

K. Friedrich, "Friction & Wear of Composites", Presented at Composites Workshop Delaware, pp. 1–6 (May 16, 1986).

K. Friedrich, ed., "Friction & Wear of Polymer Composites", *Composite Materials Series*, vol. 1, pp. v, 10–21, 236–237, Elsevier, New York, (1986).

(Continued)

Primary Examiner—Caixia Lu

(57) ABSTRACT

Internally lubricated polymer compositions containing a styrene- and/or polyphenylene ether-containing polymer, an olefin-containing polymer, and a compatibilizer are provided. The olefin-containing polymer, which is present in the compositions in about 3 to about 30 weight percent, provides internal lubrication and improves the tribological properties of the compositions compared with the styrene- or polyphenylene ether-containing polymer alone, as determined by wear measurements. Preferred compositions exhibit wear factors less than about $130 \times 10^{-11n}$ mm$^5$/Pa-m. A preferred composition includes a blend of polystyrene/polyphenylene ether, linear low density polyethylene, and styrene-ethylene-butadiene-styrene. Methods are also provided for improving tribological properties of styrene- and/or polyphenylene ether-containing base polymers by incorporating into the base polymers at least one olefin-containing polymer and at least one compatibilizer, or by incorporating at least one substantially halogen-free internal lubricant.

16 Claims, 2 Drawing Sheets

OTHER PUBLICATIONS

S. Haaga, et al., "Polystyrene/Polyethylene Blends Compatibilized with a Triblock Copolymer: Correlation Between Rheology and Morphology", *Polym. Networks Blends*, 4 (2), pp. 61–67 (1994).

"Low Cost, High Temperature, Lubricated Compositions Now Available From LNP", http://www.lnp.com/LNP-Site.nsf/60d01280023c3c47852568a10006363eb/134617c1711af . . . , from Oct. 31, 2002.

Lubricomp® "A Guide to LNP's Internally Lubricated Thermoplastics", Bulletin, pp. 254–0196, pp. 1–35, LNP Corporation, (1996).

Lubricomp® "Internally Lubricated Reinforced Thermoplastics and Fluoropolyermer Composites", Bulletin, 254–688, pp. 1–27, LNP Corporation.

Lubricomp®, http://www.lnp.com/LNPSite.nsf/LNP+Products/Lubricomp?OpenDocument, from Oct. 31, 2002.

N. P. Suh, et al., "The Genesis of Friction", *Wear*, 69, pp. 91–93, 101–111 (1981).

Uniroyal Chemical Co., Inc., Royaltuf® 465A Sales Specifications.

H. Voss, et al., "On the Wear Behaviour of Short–Fibre–Reinforced PEEK Composites", *Wear*, 116, pp. 1–18 (1987).

* cited by examiner

COMPOSITIONS CONTAINING POLYPHENYLENE ETHER AND/OR POLYSTYRENE HAVING IMPROVED TRIBOLOGICAL PROPERTIES AND METHODS FOR IMPROVING TRIBOLOGICAL PROPERTIES OF POLYPHENYLENE ETHER AND/OR POLYSTYRENE COMPOSITIONS

BACKGROUND OF THE INVENTION

Traditionally, wear systems utilize external lubricants, such as oil or grease, to increase the wear resistance and to reduce frictional losses between moving contacting surfaces of components in tribological systems. However, such external lubricants often must be replaced periodically and may be unevenly distributed over the wear surface, resulting in increased cost and inefficiency of the wear system. Additionally, in some areas, such as food processing and photocopying, in which product contamination is a concern, traditional external lubricants may be undesirable.

Therefore, in many wear systems, it may be desirable to replace or eliminate external lubricants by using internal lubricants in polymeric components to improve the tribological properties (such as wear resistance and friction resistance). Internal lubricants can be used to reduce coefficients of friction between polymeric and metallic surfaces, increase wear resistance, improve flow characteristics, and enhance properties of the polymer, such as knitting and wetting. The use of an internal lubricant can either eliminate the need for an external lubricant or provide improved part life in an application that cannot tolerate an external lubricant. Commonly used internal lubricants include waxes, fatty acids, metal stearates, aramid, silicone, graphite, and molybdenum disulfide. Additionally, certain fluoropolymers are known to contribute low coefficients of friction in certain polymers. For example, polytetrafluoroethylene (PTFE), which has a very low coefficient of friction and exhibits favorable lubricant properties, is a commonly used internal lubricant for many compounds and base polymers.

However, in some systems, it may be desirable to utilize a composition free of PTFE. For example, some applications require materials which are non-halogenated, and thus PTFE should be avoided. PTFE is also known to adversely affect the impact properties of some polymer composites, which would preclude the use of such a compound in such applications in which impact strength is of increased importance. Finally, PTFE is generally more expensive than base polymers in which it is compounded, in which case the level of benefit imparted by the PTFE may not justify the added expense. However, since some level of internal lubrication may still be desirable, alternatives to PTFE are needed.

Methods for using polyolefins as internal lubricants to improve the tribological properties of various types of polymer composites are known. Such composites include polyamide/polypropylene blends and polycarbonate compositions, including polycarbonate/polyolefin blends. However, there remains a need in the art for a PTFE replacement which will function as an internal lubricant for polyphenylene ether and/or styrene-containing compositions and is demonstrated to improve the tribological properties of such compositions, yet exhibits none of the disadvantages of PTFE outlined above.

BRIEF SUMMARY OF THE INVENTION

The invention includes a composition comprising: (a) a base polymer selected from the group consisting of a polymer comprising styrene and a polymer comprising polyphenylene ether; (b) a polymer comprising olefin for providing internal lubrication; and (c) a compatibilizer; wherein the composition exhibits improved tribological properties in comparison with the base polymer alone.

The invention also includes a molded article prepared from a composition comprising (a) a base polymer selected from the group consisting of a polymer comprising styrene and a polymer comprising polyphenylene ether; (b) a polymer comprising olefin for providing internal lubrication; and (c) a compatibilizer; wherein the composition exhibits improved tribological properties in comparison with the base polymer alone.

A flame retardant article is also provided by the invention. The article is prepared from a composition comprising (a) a base polymer selected from the group consisting of a polymer comprising styrene and a polymer comprising polyphenylene ether; (b) a polymer comprising olefin for providing internal lubrication; (c) a compatibilizer; and (d) a flame retardant; wherein the composition exhibits improved tribological properties in comparison with the base polymer alone.

A method of improving a tribological property of a base polymer wherein the base polymer is selected from the group consisting of a polymer comprising styrene and a polymer comprising polyphenylene ether is also included in the invention. The method comprises providing at least one polymer comprising olefin and at least one compatibilizer to the base polymer to form a composition.

A further method of improving a tribological property of a base polymer selected from the group consisting of a polymer comprising styrene and a polymer comprising polyphenylene ether is also provided herein. The method comprises providing at least one substantially halogen-free internal lubricant to the base polymer to form a composition.

The invention also provides a method of improving the wear resistance of a base polymer in a dry, smooth contact sliding tribological wear system, wherein a surface of the base polymer bears against another surface causing friction. The method comprises: (a) providing a base polymer selected from the group consisting of a polymer comprising styrene and a polymer comprising polyphenylene ether; (b) providing a polymer comprising olefin to the base polymer; (c) providing a compatibilizer to the base polymer; and (d) melt mixing the base polymer, the polymer comprising olefin, and the compatibilizer to form a composition. The composition has an increased wear resistance compound to the base polymer and a wear factor of less than about $130 \times 10^{-11}$ mm$^5$/Pa-m in a tribological system.

Finally, the invention includes a method of providing an internal lubricant to a base polymer wherein the base polymer is selected from the group consisting of a polymer comprising styrene and a polymer comprising polyphenylene ether. The method comprises providing at least one polymer comprising olefin and at least one compatibilizer to the base polymer to form a composition.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
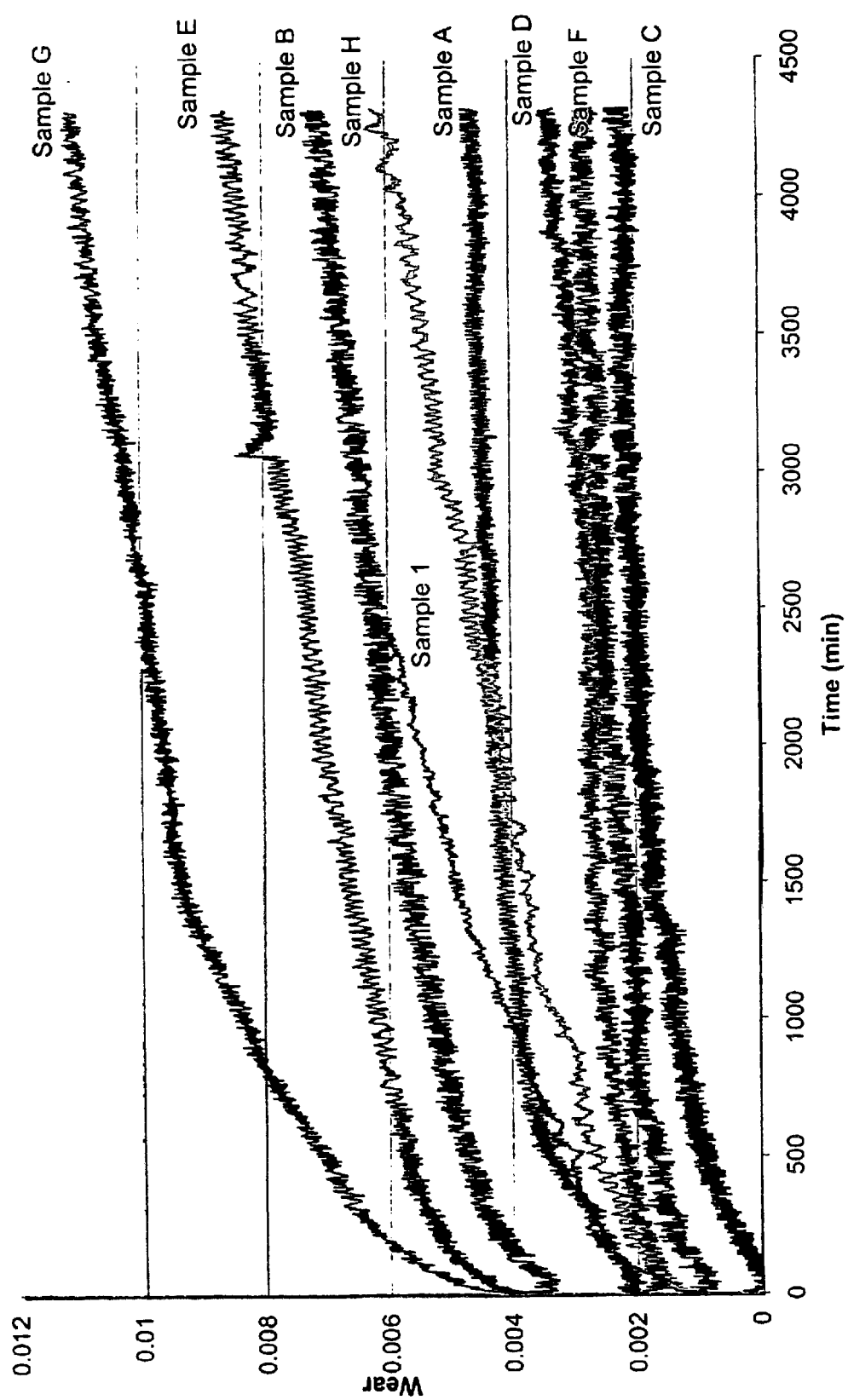
FIG. 1 is a graphical representation of the wear rate of several compositions of the invention measured in real time.

An internally lubricated polymer composition is provided which may be used in tribological wear systems, particularly those in which the tribological system includes a component comprising styrene or based on a styrene monomer and/or a component comprising polyphenylene ether (PPE). The use of such compositions reduces or eliminates the need for an external lubricant, while providing a halogen-free, relatively inexpensive alternative to PTFE-lubricated styrene compositions and reducing frictional losses. The internally lubricated compositions exhibit reduced coefficients of friction and lower wear factors (better wear resistance) in polymeric/metallic tribological systems.

The compositions may be used to fabricate contacting components for tribological systems, such as those typically found in machinery or household appliances. The term "tribological" may be understood to relate to wear and friction, which may be measured as described in more detail below.

In a typical tribological wear system, the surface of a polymeric composite is brought to bear against a dry or unlubricated surface, including metallic surfaces, such as steel. For friction and wear testing of the present invention, 1141 cold rolled steel was used as the metallic surface. While components formed from the polymeric compositions of the present invention are preferably used under dry conditions, the components may also be used under wet conditions or in contact with a wide variety of materials such as other polymers, etc.

The primary wear mechanism of polymeric components in dry, smooth-contact tribological wear systems under moderate load conditions is adhesive wear. As the polymeric and metal components are brought into loaded moving (e.g., sliding) contact, the surface of the polymeric composite shears and spreads to form a polymeric film which becomes chemically attached to the surface of the metal component, i.e., a transfer film is formed on the surface of the metal component. The adhesive wear is influenced by two factors, namely the amount of work being done in the polymeric surface and the intrinsic durability of the sliding interface. The wear factor K, or rate of decay of the polymeric material surface, is determined by the rate of attrition and subsequent replacement of the transfer film as new layers of the surface of the polymeric material are abraded by sliding contact with the metal component. However, wear properties of materials in tribological systems are generally unpredictable based on other mechanical properties of the polymers.

The present polymeric compositions may be used to form tribological wear components having high wear resistance (low wear factor) and low coefficient of friction for use in a wide variety of sliding components.

In one preferred embodiment, the present composition preferably comprises at least three primary components: a base polymer comprising styrene and/or polyphenylene ether, a polymer comprising olefin, which provides internal lubrication, and a compatibilizer. The resulting internally lubricated composition exhibits improved tribological properties compared with the base polymer alone.

The composition preferably contains a base polymer comprising polyphenylene ether, and in an alternate embodiment may comprise a styrene-containing polymer in addition to or instead of polyphenylene ether. The styrene-containing polymer may be any homopolymer or copolymer based on a styrene monomer and derivatives thereof, including, but not limited to, polystyrene, polyacrylonitrile-butadiene-styrene (ABS), polystyrene-acrylonitrile (SAN), or blends of any of the foregoing materials with other polymers such as preferably polyphenylene ether. The most preferred base polymer is a polyphenytene ether/polystyrene blend, such as those commercially available as Noryl® from General Electric. Such blends are preferred due to high temperature performance, chemical resistance, and strength. However, depending on the particular application, an alternative base polymer or blend of polymers may be more desirable.

The olefin-based component which provides internal lubrication for the polyphenylene ether and/or styrene-containing base polymer may be any polymer which would be considered a polyolefin by those skilled in the art. Preferred olefin-based polymers include, but are not limited to high density polyethylene (HDPE), low density polyethylene (LDPE), linear low density polyethylene (LLDPE), polypropylene, and ethylene-propylene copolymers. Other olefin-based polymers within the scope of the invention include ethylene-vinyl acetate, ethylene-vinyl alcohol, ethylene-acrylic acid, ethylene-cycloolefin copolymers, and polybutylenes, such as polyisobutylene and polybut-1-ene. The most preferred olefin-comprising polymer is LLDPE because it has been shown to result in compositions with particularly low wear factors. However, depending on the particular application, an alternative olefin-based polymer may be more desirable.

Finally, one or more compatibilizers for use in the compositions are preferably copolymers formed from both styrene and olefin monomers, such as polystyrene-ethylene-butadiene-styrene (SEBS), styrene-ethylene interpolymers, polystyrene-ethylene-propylene (SEP), and styrene-butadiene rubber. However, other compatibilizers known to those in the art or to be developed would also function within the scope of the invention. The compatibilizer functions to make the compositions more moldable, and also allows them to retain a higher proportion of the styrene- or polyphenylene ether-containing base polymer's properties, such as impact strength. The preferred compatibilizer is SEBS, but depending on the particular application, an alternative compatibilizer may be more desirable.

The polymer comprising olefin is preferably present in the compositions in an amount of about 3 to about 30 weight percent based on the total weight of the compositions, and about 5 to about 15 weight percent in a more preferred embodiment. If the amount of olefin-containing polymer becomes too low, the wear factor of the compositions may be undesirably high, and thus the compositions may not be appropriate for use in some wear applications. Alternatively, higher percentages of polymer containing olefin may result in compositions which exhibit properties more like the olefin-containing polymer than the polyphenylene ether or styrene-containing base polymer, which may not be more desirable for wear applications than the preferred compositions, and may result in undesirable mechanical properties.

The compatibilizer is preferably present in the compositions in an amount of about 1 to about 20 weight percent, and more preferably about 3 to about 10 weight percent of the total weight of the compositions, depending on the amount of olefin-containing polymer in the compositions and on the particular base polymer or polymers used in the compositions. The incorporation of higher amounts of compatibilizer tends to increase the viscosity of the compositions, which may be desirable or undesirable depending on the particular application. The ratio of olefin-containing polymer to compatibilizer is preferably about 0.5:1 to about 10:1, and more preferably about 1:1 to 2:1.

In addition to these three components, the compositions may further include standard additives. Typical performance enhancements obtained by these additives include but are not limited to reinforcement, flame retardance, thermal and/or electrical conductivity, dimensional stability, flow, and impact modification. It is preferred that such additives do not materially affect the tribological properties of the compositions. Typical additives include fillers, reinforcing agents, additional lubricants, coloring agents such as tints, processing aids, impact modifiers, plasticizers, slip agents, ultraviolet absorbers or stabilizers, flame retardants, mold release agents, flow modifiers and/or heat stabilizers. Specific examples of such additives include carbon fiber, carbon powder, glass fiber, glass powder, glass beads, aramid fiber, polyethylene terephthalate fiber, stainless steel fiber, ceramic fiber, ceramic powder, wollastonite, talc clay, mica, pigments, stearates, waxes, molybdenum disulfide and various oils, including silicone oil. Preferably, additives are minimized, particularly those which may have any significant detrimental effect on wear and/or frictional properties of the compositions.

A preferred composition according to the invention comprises a flame retardant, and Such a composition may be used to prepare a flame retardant article. The flame retardant for inclusion in the composition may be a halogen-containing flame retardant, such as decabromodiphenylether, tetrabromobisphenol A, or a brominated oligomer or polymer; a phosphorus-containing flame retardant, such as red phosphorus, a phosphate, a phosphonate, or a phosphoric acid ester such as resorcinol diphosphate; a nitrogen-containing flame retardant such as melamine cyanurate; or a combination of one or more of these types of flame retardants, such as melamine polyphosphate. These specific flame retardants are only exemplary and other flame retardants known in the art or to be developed would also be appropriate for use in the compositions according to the invention. Preferred flame retardants are nonhaloganted flame retardants, such as resorcinol diphosphate and bisphenol A diphosphate. The flame retardant is preferably included in the composition in an amount of about 3 to 30% by weight, and more preferably about 5 to 15% by weight of the total weight of the composition.

In order to form the compositions having improved tribological properties, the components may be blended or melt mixed in any suitable manner known to those in the art, such as by melt-mixing using any appropriate thermoplastic processing apparatus, blender, mixer and the like, or by melt processing. Alternatively, blending may be accomplished using static or screw/auger-type mixing, for example. Preferably, the components are combined in a twin-screw compounding extruder, such as are commercially available from Werner Pfleiderer or a Buss kneader from Buss (America) Inc. of Elk Grove Village, Ill.

The compositions according to the invention may also be formed into molded articles using any suitable method known to those in the art including extrusion molding, compression molding, injection molding, co-extrusion, extrusion/compression, and the like, either in raw or pelletized form. The components may also be blended with other molding pellets or powders of other thermoplastics.

The tribological properties of the polymer compositions according to the invention may be assessed by evaluating the dynamic friction and wear values as follows. Typically, the friction and wear testing are determined according to a standard thrust washer dry sliding wear test method similar to that described in ASTM D3702. Briefly, a polymeric sample is mated against a steel thrust washer in an LRI-1a Automated Tribometer (Lewis Research, Inc.), which collects continuous data and observes the wear, friction, and temperature of the tribological system. The value obtained for the friction coefficient will depend on both the load (pressure or perpendicular force) and the velocity, which correspond to a certain pressure-velocity (PV) value. This value contributes to the wear factor, also known as a K factor. The test can be of varying length, but typically runs for longer than 24 hours, and can run for seven days or more.

To analyze the tribological properties of the compositions according to the present invention, wear tests were conducted at a contact pressure of 275.8 kPa and a test speed of 0.254 m/s at room temperature (approximately 23° C.) against a mating metal surface of 1141 cold rolled steel. Each sample was run for 75 hours and the relevant measurements recorded. Wear factors (represented by K, in units of $mm^5$/Pa-m) for each composition were based on overall wear rates and represent the system wear rather than the wear of either individual component.

The wear values for the compositions according to the present invention as determined by the above described test are less than about $130 \times 10^{-11}$ $mm^5$/Pa-m, and more preferably less than about $65 \times 10^{-11}$ $mm^5$/Pa-m. The dynamic coefficient of friction of the compositions is typically less than about 0.5. In comparison, unlubricated 100% polystyrene and 1:1 polystyrene/polyphenylene ether blend both exhibit a wear value of approximately $3000 \times 10^{-11}$ $mm^5$/Pa-m under the same conditions, and dynamic coefficients of friction of 0.73 and 0.88, respectively. However, the same PPE/PS blend containing a traditional internal lubricant, PTFE, would exhibit a wear factor of approximately $130 \times 10^{-11}$ $mm^5$/Pa-m, comparable to the wear factors of the compositions according to the invention. It can thus be seen that the present compositions function as an excellent, non-halogenated alternative to PTFE as an internal lubricant for styrene- and/or polyphenylene ether-containing systems.

In addition to the compositions, the invention also provides a method of improving a tribological property of a base polymer comprising polyphenylene ether and/or styrene. The method comprises providing at least one polymer comprising olefin and at least one compatibilizer to the base polymer to form a composition. The nature and relative amounts of the polyphenylene ether- and/or styrene-containing polymer, the olefin-containing polymer, and the compatibilizer may be any as previously described. By incorporating the olefin-containing polymer and the compatibilizer, the resulting composition exhibits a wear factor less than about $130 \times 10^{-11}$ $mm^5$/Pa-m and more preferably less than about $65 \times 10^{-11}$ $mm^5$/Pa-m. Additional components may also incorporated into the composition, such as the additives previously described, provided it is preferred that for wear applications the tribological properties are not adversely affected. The composition may be prepared by any known method, such as those previously described.

A second method of improving a tribological property of a base polymer comprising styrene and/or polyphenylene ether according to the invention comprises providing at least one substantially halogen-free internal lubricant to the base polymer to form a composition. The substantially halogen-free internal lubricant is preferably, but not limited to an olefin-containing polymer as previously described, and preferably is incorporated into the composition in an amount of about 3 to about 30 weight percent, and more preferably about 5 to about 15 weight percent of the composition based on the total weight of the composition. In a preferred embodiment, the method further comprises providing a compatibilizer, such as those described previously, into the composition. The preferred amount of compatibilizer is about 1 to 20 weight percent, and more preferably about 3 to about 10 weight percent based on the total weight of the composition, and the ratio of olefin-containing compound to compatibilizer is preferably about 0.5:1 to about 10:1. The resulting composition preferably exhibits a wear factor as previously described.

The invention also provides a method of improving the wear resistance of a base polymer in a dry, smooth contact sliding tribological wear system, wherein a surface of the base polymer bears against another surface causing friction and wear. The method comprises: (a) providing a base polymer comprising polyphenylene ether and/or styrene; (b) providing a polymer comprising olefin to the base polymer; (c) providing a compatibilizer to the base polymer; and (d) melt mixing the base polymer comprising polyphenylene ether and/or styrene, the polymer comprising olefin, and the compatibilizer to form a composition. The composition has an increased wear resistance and a wear factor of less than about $130 \times 10^{-11}$ mm$^5$/Pa-m in a tribological system. The components of the composition and their preferred weight percentages in the composition are as previously described. The tribological systems intended herein are also described above. Wear resistance is improved in the method and the tribological properties of the composition are improved over the base polymer alone (lower K factor and lower coefficients of friction).

Finally, the invention relates to a method of providing an internal lubricant to a styrene- and/or polyphenylene ether-containing base polymer. The method comprises providing at least one polymer comprising olefin and at least one compatibilizer to the base polymer. The styrene- and/or polyphenylene ether-containing polymer, olefin-containing polymer, and compatibilizer and their preferred amounts and ratios are as previously described. The resulting wear factor is preferably less than about $130 \times 10^{-11}$ mm$^5$/Pa-m, and more preferably less than about $65 \times 10^{-11}$ mm$^5$/Pa-m.

The invention will now be described in further detail with respect to the following non-limiting examples:

EXAMPLES A–H

Eight compositions were prepared by blending a base polymer containing a blend of 1:1 polyphenylene ether/styrene, a polyolefin, and a compatibilizer. The base polymer was Noryl®731 or Noryl®EN185 (commercially available from General Electric), in which the "EN 185" blend contains a flame retardant. As a compatibilizer, polystyrene-ethylene-butadiene-styrene (SEBS) grade Kraton™ G2705 or G1651 (commercially available from Kraton Polymer) was included. Finally, the polyolefin was either a linear low density polyethylene (LLDPE) (Petrothene GA818-07, commercially available from Equistar) or a polyethylene/polypropylene (PE/PP) copolymer (C105-02, commercially available from Dow Chemical). Each composition contained 7.5% or 15% by weight of total polyolefin and compatibilizer and a 2:1 ratio of polyolefin to compatibilizer. The relative amounts of the components of each composition, denoted A–H, are shown in Table 1.

The compositions were prepared by hand blending and were extruded using a Werner Pfleiderer ZSK-40™ twin screw-extruder and subsequently pelletized. The extruded compositions were injection molded into 3.175 mm thick plaques from which parts were machined for testing. The machined parts were approximately 28.6 mm outer diameter, with an outer annular region having an inner diameter of approximately 22.9 mm which was the contact surface for testing. The friction and wear testing of each specimen was determined according to the thrust washer dry sliding wear test method using the parameters described previously. The results of the friction and wear loss testing, as well as other physical properties of the compositions, are set forth in Table 1.

It can be seen from the data that the overall wear factor for each composition ranged from 41 to $157 \times 10^{-11}$ mm$^5$/Pa-m, and the dynamic coefficient of friction ranged from 0.309 to 0.443. Lower wear factors were obtained using LLDPE (41 to $56 \times 10^{-11}$ mm$^5$/Pa-m) rather than polyethylene/polypropylene (PE/PP) copolymer as the polyolefin. For comparison, the wear factor of pure Noryl® 731 is $3900 \times 10^{-11}$ mm$^5$/Pa-m, demonstrating the effectiveness of the polyolefin internal lubricant according to the invention.

The LRI-1a Automated Tribometer is additionally capable of plotting the wear performance of a composition in real time. The slope of the line is used to calculate the wear factor, such as those cited previously. The resulting wear data are shown graphically in FIG. 1.

EXAMPLE I

The composition was prepared by the method described above using 100% polystyrene as the base polymer, 15% SEBS (Kraton G1651) as the compatibilizer, and 10% LLDPE as the polyolefin. The wear data for the resulting composition are shown in Table 1 and FIG. 1. The wear factor for composition I was $59 \times 10^{-11}$ mm$^5$/Pa-m, compared with $3900 \times 10^{-11}$ mm$^5$/Pa-m for pure polystyrene. This demonstrates that tribological properties of pure polystyrene can be improved by incorporating an appropriate polyolefin and compatibilizer.

TABLE 1

| | Sample No. | | | | | | | | | |
|---|---|---|---|---|---|---|---|---|---|---|
| | A | B[a] | C | D[b] | E | F[a] | G | H[b] | I | Comp. 1 |
| PPE/PS ratio | 1:1 | 1:1 | 1:1 | 1:1 | 1:1 | 1:1 | 1:1 | 1:1 | 100% PS | |
| SEBS type | G1651 | G1651 | G2705 | G1651 | G2705 | G2705 | G1651 | G2705 | | |
| SEBS wt % | 5 | 5 | 2.5 | 2.5 | 5 | 5 | 2.5 | 2.5 | 15 | |
| Olefin type | LLDPE | PE/PP copolymer | LLDPE | LLDPE | PE/PP copolymer | LLDPE | PE/PP copolymer | PE/PP copolymer | LLDPE | PP |

TABLE 1-continued

| | Sample No. | | | | | | | | | |
|---|---|---|---|---|---|---|---|---|---|---|
| | A | B[a] | C | D[b] | E | F[a] | G | H[b] | I | Comp. 1 |
| Olefin wt % | 10 | 10 | 5 | 5 | 10 | 10 | 5 | 5 | 10 | 100 |
| Tribological Properties | | | | | | | | | | |
| Overall Wear Factor ($10^{-11}$ mm$^5$/Pa-m) | 56 | 95 | 55 | 42 | 109 | 44 | 157 | 130 | 59 | 234 |
| Dynamic COF | 0.349 | 0.443 | 0.309 | 0.409 | 0.365 | 0.338 | 0.329 | 0.422 | 0.328 | 0.599 |
| Physical Properties | | | | | | | | | | |
| Water absorption, % | 0.062 | 0.058 | 0.069 | 0.059 | 0.048 | 0.048 | 0.064 | 0.058 | | |
| Specific gravity | 1.05 | 1.07 | 1.06 | 1.08 | 1.04 | 1.06 | 1.06 | 1.08 | | |
| Tensile strength, MPa | 39.3 | 32.5 | 44.6 | 41.4 | 35.4 | 29.0 | 45.1 | 36.8 | | |
| Tensile elongation, % | 18.5 | 8.1 | 20.2 | >50 | 2.4 | 8.4 | 20.5 | 19.9 | | |
| Flexural strength, MPa | 65.9 | 59.4 | 77.1 | 69.1 | 60.7 | 51.1 | 78.7 | 66.9 | | |
| Flexural modulus, MPa | 1910 | 1868 | 2358 | 2248 | 2048 | 1765 | 2330 | 2199 | | |
| Notched Izod, J/m | 210.8 | 116.9 | 239.7 | 371.5 | 126.0 | 235.9 | 207.1 | 227.9 | | |
| Unnotched Izod, J/m | nb* | 437.7 | nb | nb | 266.9 | 699.3 | nb | 1324 | | |
| HDT[‡] @ 1.8 MPa ° C. | 100.3 | | 99.8 | 79.3 | | | | | | |
| Capillary rheometry | | | | | | | | | | |
| @500 l/s, Pa-s | 434.6 | 240.4 | 395.1 | 260 | 285.2 | 222.9 | 412.2 | 240.8 | | |
| @1000 l/s, Pa-s | 280.3 | 159.8 | 253.9 | 175.7 | 181.6 | 146.5 | 261.6 | 156.3 | | |
| @2000 l/s, Pa-s | 176.5 | 101.4 | 161.6 | 113.1 | 116.2 | 95.5 | 166.2 | 102.8 | | |
| @3000 l/s, Pa-s | 141.3 | 80.4 | 129 | 89.6 | 92.9 | 77 | 132.7 | 82.6 | | |
| @4000 l/s, Pa-s | 113.1 | 65.4 | 104.1 | 73.2 | 74.6 | 62.7 | 109.5 | 67.3 | | |

*nb = no break (favorable result)
[‡]HDT = heat deflection temperature
[a]Also contains 10.6% flame retardant (butylated triphenyl phosphate)
[b]Also contains 11.6% flame retardant (butylated triphenyl phosphate)

EXAMPLES J–Q

Figure 2:
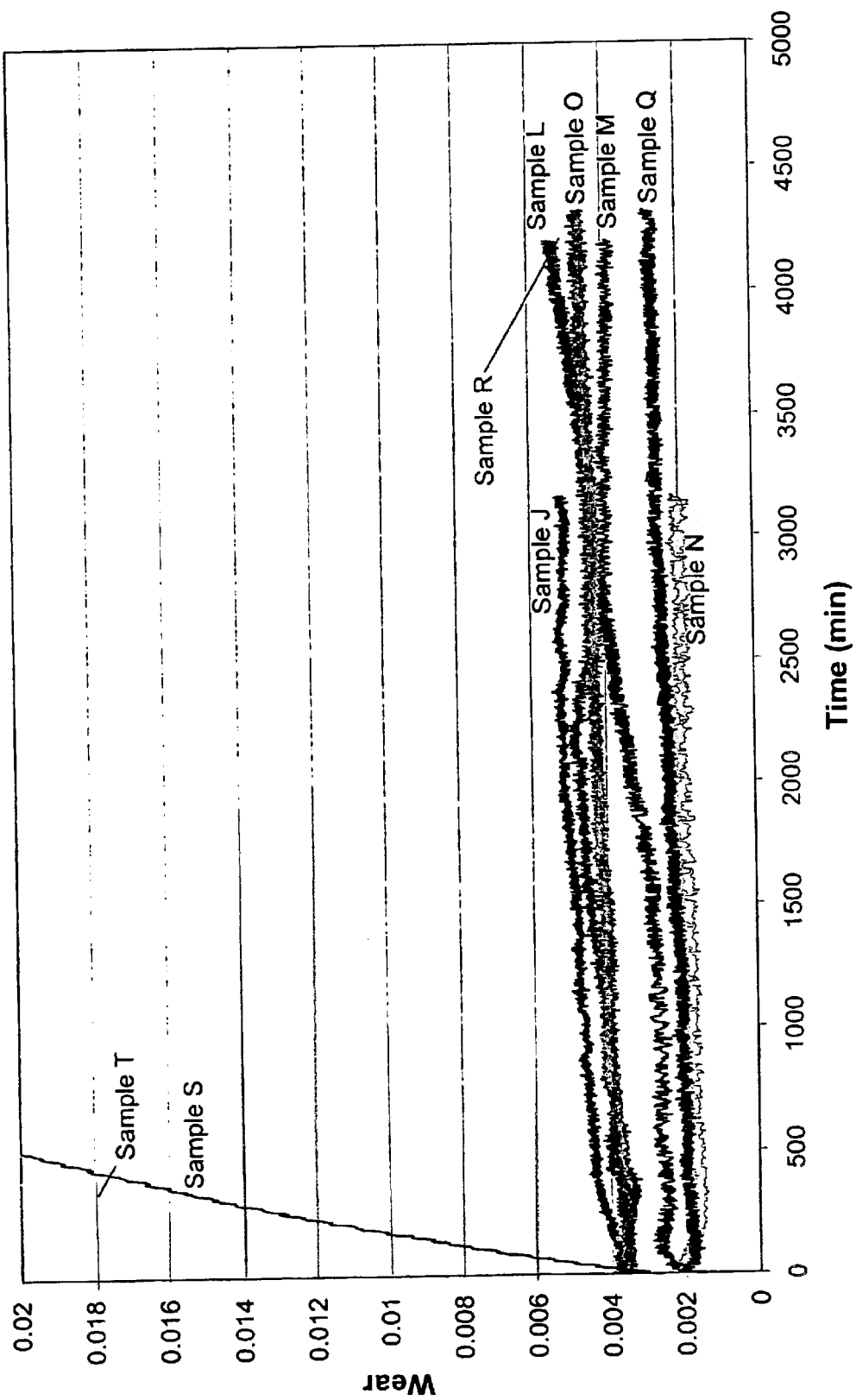
FIG. 2 is a graphical representation of the wear rate of several additional compositions of the invention measured in real time.

Eight additional compositions were prepared by the method described above using a 1:1 polyphenylene ether/styrene blend as the base polymer (Noryl®731), SEBS (Kraton™ G1651) as the compatibilizer, and LLDPE (Petrothene GA818-07) as the polyolefin. Each composition contained between 2 and 30% by weight of polyolefin, 0 to 6% by weight compatibilizer, and a ratio of polyolefin to compatibilizer which ranged from 30:0 to 2:1. The relative amounts of the components of each composition are shown in Table 2. The properties were assessed as previously described and are tabulated in Table 2 and shown graphically in FIG. 2.

TABLE 2

| | Sample No. | | | | | | | | | | |
|---|---|---|---|---|---|---|---|---|---|---|---|
| | J | K | L | M | N | O | P | Q | R[a] | S | T |
| PPE/PS ratio | 1:1 | 1:1 | 1:1 | 1:1 | 1:1 | 1:1 | 1:1 | 1:1 | 1:0 | 1:1 | 1:1 |
| SEBS type | G1651 | G1651 | G1651 | G1651 | G1651 | G1651 | G1651 | G1651 | G1651 | G1651 | G1651 |
| SEBS wt % | 0 | 0 | 1 | 2 | 5 | 4 | 2 | 6 | 7.4 | 0.4 | 1 |
| Olefin type | LLDPE | LLDPE | LLDPE | LLDPE | LLDPE | LLDPE | LLDPE | LLDPE | LLDPE | LLDPE | LLDPE |
| Olefin wt % | 10 | 30 | 10 | 10 | 10 | 20 | 20 | 30 | 5.8 | 2 | 2 |
| Tribological Properties | | | | | | | | | | | |
| Overall Wear Factor ($10^{-11}$ mm$^5$/Pa-m) | 52 | | 105 | 96 | 16 | 34 | | 31 | 29 | 1386 | 1239 |
| Dynamic COF | 0.281 | | 0.399 | 0.433 | 0.509 | 0.512 | | 0.445 | | 0.294 | 0.301 |
| Physical Properties | | | | | | | | | | | |
| Specific gravity | 1.03 | 1.01 | 1.03 | 1.03 | 1.03 | 1.01 | 1.02 | 1.01 | 1.09 | 1.05 | 1.05 |
| Tensile strength, MPa | 40.0 | 25.1 | 39.1 | 39.7 | 41.0 | 31.9 | 29.6 | 27.6 | 58.5 | — | 50.6 |
| Tensile elongation, % | 11.3 | 3.4 | 8.8 | 7.4 | 10.4 | 11.3 | 2.8 | 10.3 | 8.7 | — | 27 |
| Flexural strength, MPa | 71.8 | 42.5 | 71.4 | 72.2 | 74.9 | 54.6 | 53.6 | 46.0 | 91.8 | 85.9 | 88.3 |
| Flexural modulus, MPa | 2213 | 1455 | 2220 | 2241 | 2255 | 1634 | 1710 | 1372 | 2241 | 2303 | 2606 |
| Notched Izod, J/m | 106.8 | 66.7 | 137.7 | 140.4 | 184.2 | 103.6 | 68.9 | 105.7 | 341.6 | 209.8 | 224.2 |
| Unnotched Izod, J/m | 443.0 | 384.3 | 472.9 | 478.3 | 709.9 | 617.1 | 453.7 | 1105 | nb* | nb | nb |
| HDT[‡] @ 1.8 MPa ° C. | 109.8 | 108.9 | 105.7 | 107.8 | 119.8 | 108.6 | 112.9 | 94.8 | 118.3 | 113.7 | 108 |
| Flammability, 1.6 mm | | | | | | | | | V-0 | | |
| Delamination (1–6) | 3.5 | 2 | 4 | 3 | 2.5 | 2.5 | 3 | 3 | 2 | 3 | 1 |
| Melt stability @1000 l/s | | | | | | | | | | | |
| @5.2 min, Pa-s | 218 | 184.8 | 236.6 | 265.4 | 286.4 | 266 | 229.4 | 261.9 | | 294.8 | 294.8 |
| @10.4 min, Pa-s | 222.9 | 191.3 | 242 | 278 | 293.4 | 274.5 | 248.6 | 269.1 | | 304.3 | 300.6 |

TABLE 2-continued

| | Sample No. | | | | | | | | | |
|---|---|---|---|---|---|---|---|---|---|---|
| | J | K | L | M | N | O | P | Q | R[a] | S | T |
| @15.6 min, Pa-s | 227.6 | 189.3 | 240.2 | 271.4 | 287.1 | 267.2 | 243.7 | 266.7 | | 300.8 | 299.7 |
| @20.8 min, Pa-s | 223.6 | 188.8 | 237.4 | 276.3 | 286.3 | 268.8 | 243.4 | 264.4 | | 298.2 | 293.4 |
| @26 min, Pa-s | 235.3 | 196.2 | 246 | 276.6 | 297.5 | 278.6 | 252.3 | 273.7 | | 300.3 | 304.1 |

*nb = no break (favorable result)
[a]Also contains 11.9% flame retardant (resorcinol diphosphate)
‡HDT = heat deflection temperature Samples J, L, M, and N, which all contain 10% polyolefin and increasing concentrations of compatibilizers from 0 to 5 weight %, all exhibit favorable wear factors between 16 and $105 \times 10^{-11}$ mm$^5$/Pa-m. These samples also demonstrate that an increase in the concentration of compatibilizer improves the impact strength, as evidenced by the increase in Notched Izod values. Specifically, the Notched Izod impact value of Noryl®731 is 215 J/m. In comparison, sample J, which contains no compatibilizer, has a notched Izod impact value of 106.8 J/m. However, as the concentration of compatibilizer increases, the notched Izod impact value increases as well, such that sample N, which contains 5% compatibilizer, exhibits an impact value of 184.2 J/m, approaching that of the base polymer. Accordingly, the presence of the compatibilizer in the composition helps to retain the properties of the base polymer.

EXAMPLE R

A flame retardant composition "R" was prepared by the method described above using Noryl®PPE (containing no styrene) as the base polymer, SEBS (Kraton™ G1651) as the compatibilizer, and LLDPE (Petrothene GA818-07) as the polyolefin. The Noryl material contains a flame retardant (resorcinol diphosphate (RDP), commercially available from Akzo Nobel as Fyrolflex). The weight percentages of each of the components are shown in Table 2. The properties were assessed as previously described and are included in Table 2. It can be seen that a favorable wear factor of $29 \times 10^{-11}$ mm$^5$/Pa-m was obtained, demonstrating that polyolefin is effective at providing internal lubrication to polymer compositions based solely on polyphenylene ether. Further, this example demonstrates that in some situations, it may be desirable to include more compatibilizer than olefin-containing polymer in the composition. This example further demonstrates that incorporation of additives such as a flame retardant may achieve additional properties without reducing the effectiveness of the olefin lubricant.

COMPARATIVE EXAMPLE I

As a comparison, a sample of a polypropylene/polyphenylene ether blend, in which polypropylene is the predominant component (commercially available as Noryl®PPX 7110 from General Electric) was evaluated and was found to exhibit a wear factor of $234 \times 10^{-11}$ mm$^5$/Pa-m and a dynamic coefficient of friction of 0.599 under the same conditions. It can also be graphically observed in FIG. 2 that the slope for the polypropylene/polyphenylene ether blend is higher than the examples of the invention, indicating a higher wear factor.

EXAMPLES S and T

Two samples were prepared as previously described which contained Noryl®731 as the styrene polymer, LLDPE (Petrothene GA818-07), and SEBS (Kraton™ G1651). In these comparative examples, only 2% of the polyolefin was included. The resulting compositions exhibited higher wear factors of 1239 and $1386 \times 10^{-11}$ mm$^5$/Pa-m, demonstrating that the relatively low concentration of polyolefin did not improve the tribological properties as well as did greater amounts. However, the properties still compare favorably with $3900 \times 10^{-11}$ mm$^5$/Pa-m for pure polystyrine.

From all of the examples, it can be seen that the choice of olefin-containing polymer significantly affects the wear properties of the compositions. Though these samples vary in wear properties, it is clear that there is a difference in performance between the compositions containing PE/PP copolymer and those including LLDPE. Interestingly, in other blends, particularly nylon composites, it has been observed that the PE/PP copolymer provides excellent performance, with wear factors lower than those observed with the samples according to the present invention. However, as shown by these examples, LLDPE is a superior internal lubricant for systems containing polyphenylene ether and/or styrene.

It may also be observed that an increase in additive level does not necessarily result in a performance improvement. For example, in samples A and C, a total additive loading of 7.5% achieves the same wear factor as a sample containing 15% additive, and also gives a lower dynamic coefficient of friction. In considering FIG. 1, although it might be assumed at first glance that sample A is superior, it is the slope of the curve, rather than the position, which is used to determine the wear factor, and sample C performs equally well after an initial break-in period, which is common in many materials. Additionally, sample R, which contains only 7.5% additive, performs as well as those examples with higher additive loadings, even with the presence of a flame retardant.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:
1. A composition comprising:
   (a) a base polymer selected from the group consisting of a polymer comprising styrene and a polymer comprising polyphenylene ether;
   (d) a polymer consisting essentially of linear low density polvethylene for providing internal lubrioation; and
   (c) a compatibilizer;
   wherein the composition has a wear factor of less than about $65 \times 10^{-11}$ mm$^5$/Pa-m.
2. The composition according to claim 1, wherein the polymer consisting essentially of linear low density polv- ethylene comprises about 5 to about 30 weight percent of the composition based on a total weight of the composition.

3. The composition according to claim 2, wherein the polymer consisting essentially of linear low density polyethylene comprises about 5 to about 25 weight percent of the composition based on the total weight of the composition.

4. The composition according to claim 1, wherein the base polymer is selected from the group consisting of homopolymers and copolymers of styrene, acrylonitrile-butadiene-styrene and styrene-acrylonitrile.

5. The composition according to claim 1, wherein the base polymer is a blend of the styrone polymer and the polyphenylene ether.

6. The composition according to claim 1, wherein the compatiblizer comprises a styrene/olefin copolymer.

7. The composition according to claim 6, wherein the styrene/olefin copolymer is selected from the group consisting of polystyrene-ethylene-butadiene-styrene, styrene-ethylene interpolymer, styrene-butadiene rubber, and polystyrene-ethylene-propylene.

8. The composition according to claim 1, wherein the compatibilizer comprises about 1 to about 20 weight percent of the composition based on a total weight of the composition.

9. The composition according to claim 8, wherein the compatibilizer comprises about 3 to about 10 weight percent of the composition based on the total weight of the composition.

10. The composition according to claim 1, wherein the ratio of the weight of the polymer consisting essentially of the linear low density polyethylene to the weight of the compatibilizer is about 0.5:1 to about 10:1.

11. The composition according to claim 1, wherein the base polymer comprises a blend of polyphenylene ether and polystyrene, and wherein the compatibilizer comprises polystyrene-ethylene-butadiene-styrene or a copolymer of styrene and propylene.

12. The composition according to claim 1, further comprising:
(d) at least one additive selected from the group consisting of a filler, a reinforcing agent, an additional lubricant, a coloring agent, a processing aid, an impact modifier, a plasticizer, a slip agent, an ultraviolet absorber, an ultraviolet stabilizer, a flame retardant, a mold release agent, a flow modifier and a heat stabilizer.

13. The composition according to claim 12, wherein the at least one additive is selected from the group consisting of carbon fiber, carbon powder, glass fiber, glass beads, aramid fiber, polyethylene terephthalate fiber, stainless steel fiber, ceramic fiber, ceramic powder, wollastonite, talc clay, mica, a pigment, a stearate, a wax, molybdenum disulfide, and an oil.

14. The composition according to claim 12, wherein the at least one additive comprises a flame retardant.

15. A molded article prepared from a composition comprising:
(a) a base polymer selected from the group consisting of a polymer comprising styrene and a polymer comprising polyphenylene ether;
(b) a polymer consisting essentially of linear low density polyethylene for providing internal lubrication; and
(c) a compatibilizer;
wherein the composition has a wear factor of less than about $65 \times 10^{-11}$ mm$^5$/Pa-m.

16. An article comprising the composition of claim 1.

* * * * *